United States Patent
Rausch et al.

[11] Patent Number: 5,871,867
[45] Date of Patent: Feb. 16, 1999

[54] PRECIPITATED SILICA

[75] Inventors: Ralf Rausch, Kreuzau; Heinz Esch, Bonn; Robert Kuhlmann, Erfstadt; Guenter Tuerk, Hanau; Karl Meier, Alfter; Walter Meon, Gelnhausen, all of Germany

[73] Assignee: Degussa Aktiengesellschaft, Frankfurt am Main, Germany

[21] Appl. No.: 954,858

[22] Filed: Oct. 21, 1997

Related U.S. Application Data

[63] Continuation of Ser. No. 683,342, Jul. 18, 1996, abandoned.

[30] Foreign Application Priority Data

Jul. 20, 1995 [DE] Germany ............ 195 26 476.2

[51] Int. Cl.$^6$ ........................................ H01M 2/16
[52] U.S. Cl. ...................... 429/247; 429/252; 423/339
[58] Field of Search ................... 106/482, 492; 423/335, 339; 429/249, 250, 251, 252, 254

[56] References Cited

U.S. PATENT DOCUMENTS

| | | | |
|---|---|---|---|
| 3,351,495 | 11/1967 | Larsen et al. | 136/146 |
| 4,024,323 | 5/1977 | Versteegh | 429/249 |
| 4,237,083 | 12/1980 | Young | 264/41 |
| 4,681,750 | 7/1987 | Johnson et al. | 423/339 |
| 4,857,289 | 8/1989 | Nauroth et al. | 423/339 |
| 5,094,829 | 3/1992 | Krivak et al. | 423/339 |
| 5,605,569 | 2/1997 | Boyer et al. | 106/482 |
| 5,618,642 | 4/1997 | Samii | 429/247 |

*Primary Examiner*—Stephen Kalafut
*Attorney, Agent, or Firm*—Beveridge, DeGrandi, Weilacher & Young, L.L.P.

[57] ABSTRACT

Precipitated silica with a sodium sulphate content of 4 to 18 wt. %, particularly with the physical-chemical data:

| | |
|---|---|
| Sodium sulphate content: | 4–14 wt. % |
| BET surface area (DIN 66131): | 100–190 m$^2$/g |
| DBP absorption (anhydrous) (DIN 53601, ASTM D 2414): | 208–250 g/100 g |
| (DIN ISO 787/II) | 3.0–6.5 wt. % |
| Oversize with ALPINE air-jet sieve | >63 μm ≦ 10.0 wt. % |
| | >150 μm ≦ 0.1 wt. % |
| | >250 μm ≦ 0.01 wt. % |

It is prepared by introducing hot water into a precipitation vessel, with stirring, adding water glass, then heating the mixture and maintaining the temperature throughout the remainder of the precipitation period. Water glass and sulphuric acid are added simultaneously during this process. The precipitated silica is then separated from the suspension and the filter cake containing sodium sulphate is dried in a spray drier and ground. The precipitated silica may be used in the production of battery separators.

13 Claims, No Drawings

PRECIPITATED SILICA

This application is a continuation of application Ser. No. 08/683,342, filed Jul. 18, 1996, now abandoned which application is entirely incorporated herein by reference.

INTRODUCTION AND BACKGROUND

The present invention relates to a precipitated silica, the process for the preparation thereof, and to its use in battery separators.

It is known to use precipitated silicas for the production of microporous polyethylene battery separators (U.S. Pat. No. 3,351,495, U.S. Pat. No. 4,024,323, U.S. Pat. No. 4,681,750). A common feature of the known silicas is that the salt produced during the precipitation reaction is removed from the filter cake during filtration to a salt content as low as <2.5 wt. % by washing with water. The salt content of ≦2.5 wt. % refers to the salt content determined in the dried silica. In the filter cake, this corresponds to a salt content of 0.625% (see, for example, U.S. Pat. No. 4,681,750, column 8, Example 1, lines 20–23 and Table 1, Examples 1–3).

An object of the present invention is to reduce the amount of water needed to obtain an acceptable product. Another object is to lessen the amount of salt discharged with the effluent of the process. Further objects of the invention include obtaining improved products containing the precipitated silicas and improved processing of compositions containing precipitated silicas.

SUMMARY OF THE INVENTION

In achieving the above and other objects, one feature of the invention provides a precipitated silica having a sodium sulphate content of 4 to 18 wt. %. In particular, the precipitated silica is characterized by the following physical-chemical data:

| | |
|---|---|
| Sodium sulphate content: | 4–18, particularly 4–14 wt. % |
| BET surface area (DIN 66131): | 100–190 m$^2$/g |
| DBP absorption (anhydrous) (DIN 53601, ASTM D 2414): | 208–250 g/100 g |
| Loss on drying (2 h/105° C.) (DIN ISO 787/II, ASTM D 280, JIS K 5101/21): | 3.0–6.5 wt. % |
| Oversize with ALPINE air-jet sieve: | >63 µm ≦ 10.0 wt. % |
| | >150 µm ≦ 0.1 wt. % |
| | >250 µm ≦ 0.01 wt. % |

Another feature of the invention is a process for the preparation of precipitated silica with a sodium sulphate content of 4 to 18 wt. %, particularly with the physical-chemical data:

| | |
|---|---|
| Sodium sulphate content: | 4–18, particularly 4–14 wt. % |
| BET surface area (DIN 66131): | 100–190 m$^2$/g |
| DBP absorption (anhydrous) (DIN 53601, ASTM D 2414): | 208–250 g/100 g |
| Loss on drying (2 h/105° C.) (DIN ISO 787/II, ASTM D 280, JIS K 5101/21): | 3.0–6.5 wt. % |
| Oversize with ALPINE air-jet sieve | >63 µm ≦ 10.0 wt. % |
| | >150 µm ≦ 0.1 wt. % |
| | >250 µm ≦ 0.01 wt. % | which is carried out by introducing hot water into a precipitation vessel, with stirring, water glass with an SiO$_2$:Na$_2$O modulus of 3.22±0.05 (SiO$_2$=27.73±0.70 wt. %; Na$_2$O= 8.9±0.20 wt. %; density 1.362±0.025 g/ml) is added until an alkali value of 7±1 is obtained (the alkali value is the consumption of 1N HCl in milliliter that is required for the neutralization of 100 ml of the starting solution, with the use of phenolphthalein as indicator). The temperature of the hot water typically ranges from 89° to 93° C. and can be obtained by adding ordinary hot water and, if necessary, by adding steam (water vapor) to the sodium silica solution. The resulting reaction mixture is then heated to a temperature of 90° to 93° C., and this temperature is maintained throughout the remaining precipitation period during which further water glass of the same composition and sulphuric acid are added simultaneously at two separate places in such a way that an alkali value of 7±1 is maintained. The suspension of precipitated silica that is formed as a result of the reaction is then acidified with sulphuric acid to a pH-value of 3.0–4.0. The precipitated silica suspension having a solids content of 72 to 88 g/l is then separated by filtering means, such as a filter press, without washing; the unwashed, sodium sulphate-containing precipitated silica filter cake obtained thereby is liquefied by means of water and mechanical shear forces, dried by drying means, such a spray drier with a centrifugal atomizer at a speed of 8,500–10,000 rpm, and ground with grinding means, such as a roller mill, to produce the intended particle size distribution.

DETAILED DESCRIPTION OF THE INVENTION

According to more detailed embodiments of the invention, the reaction to form the precipitated silica of the invention is advantageously carried out by observing the following parameters.

The sulphuric acid used can be a concentrated sulphuric acid with a concentration of 90 to 98 wt. %, preferably 93 to 95 wt. %.

During precipitation, while the water glass solution and the sulphuric acid are being metered simultaneously, it is possible to maintain a rate of addition of 9,800 to 11,700 kg/h for the water glass solution and 1,300 to 1,600 kg/h for the sulphuric acid. The ingredients are added simultaneously at two different places, for example, on opposite sides of the reactor in order to maintain the pH at about 7±1. If the reaction vessel is circular in diameter, the ingredients could be added at a portion corresponding to 12 o'clock and six o'clock on a clock.

In one embodiment of the invention, the addition of water glass solution can be stopped after a 90-minute precipitation period at 90°–93° C. and the addition of sulphuric acid can be continued until a pH-value of 8.5 is reached. The sulphuric acid addition can then also be stopped and the silica dispersion can be aged for 30 minutes at 90°–93° C. After this ageing phase, the addition of sulphuric acid can be resumed and the dispersion acidified to a pH-value 3.0–4.0.

In one embodiment of the invention a different drier, that is, a spin flash drier can be used instead of the spray drier previously identified, in which case the unwashed filter cake may have a solids content of 29–37 wt. % and it is possible, optionally, to dispense with grinding.

In another embodiment of the invention, a different comminution device such as a crossflow mill can be used instead of the roller mill for grinding the silica. Drying and comminution equipment suitable for purposes herein are conventional.

The invention also provides the use of a precipitated silica with a sodium sulphate content of 4 to 14 wt. %, particularly with the following physical-chemical data:

| Sodium sulphate content: | 4–18, particularly 4–14 wt. % |
|---|---|
| BET surface area (DIN 66131): | 100–190 m²/g |
| DBP absorption (anhydrous) (DIN 53601, ASTM D 2414): | 208–250 g/100 g |
| Loss on drying (2 h/105° C.) (DIN ISO 787/II, ASTM D 280, JIS K 5101/21): | 3.0–6.5 wt. % |
| Oversize with ALPINE air-jet sieve | >63 µm ≦ 10.0 wt. % >150 µm ≦ 0.1 wt. % >250 µm ≦ 0.01 wt. % | in battery separators, particularly in polyethylene-silica battery separators for lead-acid batteries.

The precipitated silicas according to the invention can be used in battery separators (microporous separating elements) for lead-acid batteries in a concentration of 50–75 wt. %.

The precipitated silicas according to the invention are used in the production of microporous separating elements for batteries by intensive mixing of polyethylene with a high molecular weight, precipitated silica, process liquid and stabilizers, further processing of the powder mixture by extrusion to a film with a film thickness of 0.2 to 0.5 mm and by extraction of the process liquid.

The preparation of battery separator films using the sodium sulphate-containing, spray-dried silicas according to the invention can take place according to known methods, such as, for example, according to U.S. Pat. No. 3,351,495, U.S. Pat. No. 4,237,083 or DE-AS 14 96 123.

The invention also provides a battery separator containing the precipitated silica according to the invention. In one embodiment of the invention, the invention provides a battery separator for lead-acid batteries which is composed of polyethylene and contains a precipitated silica according to the invention. Other plastics can also be used such as, PVC, cellulose or phenolic resin resorcinol separators.

The precipitated silicas according to the invention with a high salt content of 4–18 wt. %, particularly 4–14 wt. % (based on the substance dried for 2 hours at 105° C.) can be prepared in a markedly more economical manner than the precipitated silicas obtainable hitherto. The variable costs of the raw materials, water and energy are reduced by a linear 7–12 wt. %, that is, approx. 5% of the total production costs. Moreover, the fixed production costs during filtration can also be reduced considerably since the washing times, if any, are reduced. The washing water costs are also wholly or partly obviated. Up to 40% of the energy costs can be saved in the drying sector. The increased salt content increases the throughput when the silica is ground. The higher bulk and tamped density leads to a reduction in the packing and freight costs.

Apart from these considerable economic advantages, the salt load in the waste water is also reduced appreciably; i.e. while a total of 97% of the salt quantity produced during silica preparation reaches the waste water when the residual salt content is 1.5 wt. %, only 84% of the salt quantity produced leaves the process via the waste water when the residual salt content is approx. 10 wt. %. In total, the load is reduced by 13–14% of the total quantity of salt produced.

If the precipitated silicas according to the invention are processed in standard recipes to form polyethylene-SiO₂ battery separators, said silicas exhibit a very stable processing behavior with regard to die pressure and torque values.

While low-salt (1–2%) spray-dried silicas prove to be very difficult, if not impossible, to process, the silicas according to the invention exhibit no shortcomings at all in this respect. The high salt content prevents the viscosity of the polymer-silica melt from becoming too high and therefore prevents an excessive melt pressure build-up in the extruder, which in turn leads to excessively high torque.

Quite surprisingly, it has become apparent that after two weeks' storage in battery acid, the PE-SiO₂ separators produced by means of the silicas according to the invention exhibit only 66% of the resistivity of those separators that have silicas with a salt content of only 1–2%, and this despite the lower SiO₂ content of the silicas according to the invention, which would have led one to expect an increase in resistivity.

EXAMPLES OF THE INVENTION

The following raw materials are converted to a mixture in powder form by intensive mixing in a high-speed mixer.

9.8–10.9 wt. % of ultra-high molecular weight polyethylene
0.1–0.2 wt. % of carbon black masterbatch
0.1–0.3 wt. % of stabilizer
28.5–29.3 wt. % of precipitated silica
60.3–60.6 wt. % of mineral oil The mixture is then processed in a twin-screw extruder at temperatures between 175° and 190° C. The battery separator film is formed with a flat-sheet die followed by a calendar. The film thickness is 0.2 to 0.25 mm.

The process of extrusion and calendering is followed by extraction. To this end, the mineral oil is removed to a large extent by extraction with n-hexane. The n-hexane absorbed by the separator film is then removed by drying at room temperature.

The precipitated silicas tested are the silicas with $Na_2SO_4$ contents of <2.5 wt. % in their spray-dried and spin flash dried form and the corresponding silicas according to the invention with $Na_2SO_4$, contents in the region of 4–18 wt. %. The following silicas with a low $Na_2SO_4$ content are thus compared with those with an increased $Na_2SO_4$ content:

| Low $Na_2SO_4$ content: | High $Na_2SO_4$ content: | |
|---|---|---|
| Example 1 (A) | Example 4 | Spray-dried silicas |
| Example 2 (B) | Example 5 | |
| Example 3 (C) | Example 6 | |
| Example 7 (D) | Example 10 | Spin flash dried silicas |
| Example 8 (E) | Example 11 | |
| Example 9 (F) | Example 12 | |

The characteristics evaluated are the absorbency of the silica and the flow properties of the mixture during the preparation of the mixture. The torque on the extruder shaft and the melt pressure in front of the die are evaluated during the metering process and during extrusion of the mixture.

The torque measurement is based on the power consumption of the drive motor and is given as a percent of the maximum permissible power consumption.

The melt pressure in bar is measured with a pressure cell, the sensor of which is immersed in the melt in front of the barrel wall. The measuring point is situated between the end of the screw and the beginning of the die.

The separator films obtained are tested as follows:
Determination of Resistivity The resistivity of the separator film is determined as the sheet resistance based on the film thickness, whereby a film sample in an acid bath is tested for resistivity.

Unit: mOhm×in$^2$/mil.

Apparatus

Battery Tester Model 9100-2 Low Resistance Test System Manufacturer: Palico Instrument Laboratories U.S.A.

Water bath/temperature-controlled.

The film thicknesses of the prepared samples are determined. Accuracy±0.01 mm. The samples are stored in battery acid. After 20 minutes' storage in battery acid, the samples are introduced individually into the appropriate device of the battery tester. The measuring procedure is started in accordance with the operating instructions of the battery tester, and the relevant measurement data are recorded. An arithmetic mean is formed from the values determined. The measured samples are again stored in battery acid. After 24 hours' storage in battery acid, the samples are introduced individually into the appropriate device of the battery tester. The measuring procedure is started in accordance with the operating instructions of the battery tester, and the relevant measurement data are recorded. An arithmetic mean is formed from the values determined.

Determination of the Tensile Strength and Elongation at Break

The tensile strength and elongation at break of the separator film are determined by extending a film sample until it ruptures. The rate of extension is kept constant during this process. The elongation and the force applied are measured.

Apparatus

Universal test machine, TZM 771 20 kN type Manufacturer: Otto Wolpert Werke GmbH Accessories: Pneumatic clamping grip for thin films Manufacturer: Otto Wolpert Werke GmbH Accessories: Load cell 500N Manufacturer: Otto Wolpert Werke GmbH Film roll cutting machine 4 Strips are cut out of each sample (crosswise to the direction of extrusion CMD) to a size of 100 (CMD)×25 (MD) mm. The film thickness of the strips is determined, accuracy±0.01 mm. The universal test machine is set up in accordance with the operating instructions. The individual test strip is clamped into the pneumatic clamping grips of the universal test machine so that there is a gap of 50 mm between the clamping grips. The clamping depth of the strips is 25 mm for each clamping grip. The load cell is adjusted to zero in accordance with the operating instructions. Range of measurement 0–50N. The elongation speed applied is 500 mm/min. The measuring procedure is started. An arithmetic mean is formed from the values determined.

Evaluation

| | |
|---|---|
| "Tensile strength": | Load in N/surface area in mm$^2$ (Test strip width × test strip thickness) = tensile strength in N/mm$^2$ |
| "Elongation at break": | Total length of sample after rupture, based on the initial length between the clamping devices multiplied by 100% gives the elongation at break. |

Puncture Resistance of the Extruded Film (Puncture Test)

The puncture resistance of the separator film is determined by pressing a cylindrical pin with a hemispherical tip through a sample. The maximum load occurring is a measure of the puncture resistance.

Apparatus

Test rig for tensile and pressure measurements with digital control, model TCD-200 Manufacturer: Chatillon Force Measurement Division, Greensboro USA Tensile and pressure measuring device DFI-10, measuring range 0–50N, graduation 0.05N Manufacturer: Chatillon Force Measurement Division, Greensboro USA Pin made of round steel Steel supporting platform Sheet steel punch screen The prepared sample (sample size: 150×180 mm) is placed on the supporting platform and fixed with the punch screen. The measuring device is activated. Each sample (min. 3) is tested 5 times. When each individual measuring procedure has ended, the puncture force in "N" shall be read off from the indicator of the pressure measuring device and recorded. An arithmetic mean is formed from the values determined.

Shrinkage Measurement of Extruded Films

The changes in length and width of the separator film (shrinkage) are determined by adjusting for and quantifying the dimensional changes occurring during the film production process, mainly during oil extraction.

Apparatus

Steel meter rule with 0.5 mm graduations

Light box with translucent glass pane, dimensions 600× 350×250 mm

Photo-dish for water bath, approx. 5 l

The sample is measured (lengthwise to the direction of extrusion (MD) and crosswise to the direction of extrusion (CMD).

Measurement 1: Accuracy: ±0.25 mm. The samples are extracted (as in the Oil Extraction process instructions). The extracted oil-reduced samples are measured (lengthwise to the direction of extrusion (MD) and crosswise to the direction of extrusion (CMD)).

Measurement 2: Accuracy: ±0.25 mm. The samples provided and treated according to measurement 1 are then immersed for 60 minutes in deionized water. After 60 minutes' storage in water, the samples are removed and wiped with a cellulose cloth. The samples are then stored for 8 hours at room temperature. The samples are measured (lengthwise to the direction of extrusion (MD) and crosswise to the direction of extrusion (CMD)).

Measurement 3: Accuracy: ±0.25 mm

Evaluation

| | |
|---|---|
| "Shrinkage due to extraction": | Measurement 2/measurement 1 × 100 − 100 = X in % |
| Shrinkage due to water": | Measurement 3/measurement 2 × 100 − 100 = X in % |

Extraction of Oil from the Extruded Film

The oil is transferred to a solvent by extraction of battery separator films (blacksheet). This oil-reduced film corresponds to the end product of the separator production process (greysheet). During the oil extraction process, a constant residual oil content of 12–14% should remain in the film, if possible. To this end, film sections (at least 10) are cut out to a particular size with paper crocodile shears.

| Dimensions: | MD = 180 mm | MD = Moving direction of machine |
|---|---|---|

| CMD = 150 mm | CMD = Crosswise to moving direction of machine |
|---|---|

Extraction of the oil from the film, with the use of n-hexane as extraction agent, takes place in three stages in three 10-liter refined steel containers:

Weigh all the samples (blacksheet). Accuracy: ±0.01 gr. Lay the samples individually in the solvent bath. Residence time in the bath:

a) 5–10 mil* films: 2 min each per solvent bath
b) 22 mil* films: 5 min each per solvent bath * 1 mil=0.0254 mm Leave the films to dry for 15 minutes in the fume cupboard with continuous aeration.

Weigh all the samples (greysheet). Accuracy: ±0.01 gr.

Example 1 (Comparison Example): Silica A 1680 kg of sodium silicate solution (8.90 wt. % of $Na_2O$; 27.73 wt. % of $SiO_2$ with an $SiO_2:Na_2O$ modulus of 3.22) and 56.4 m³ of hot water are mixed in a 75 m³ container adjusted to a temperature of 90° C. The alkali value of this mixture (consumption of 1N HCl per 100 ml starting solution against phenolphthalein) is 7.0.

Over a period of 90 minutes, while maintaining a constant alkali value of 7 and a temperature of 89°–91° C., 20910 kg of sodium silicate solution (57° C., 8.90 wt. % of $Na_2O$ and 27.73 wt. % of $SiO_2$ with an $SiO_2:Na_2O$ modulus of 3.22) and 2820 kg of 94% sulphuric acid are allowed to flow simultaneously into the starting mixture, with stirring.

The addition of sodium silicate solution is then stopped and the addition of 94% sulphuric acid is continued. 545 kg of sulphuric acid flow into the silica suspension, with stirring, in 30 minutes, the pH-value of which suspension is then 3.0. The solids content of the suspension is 87 g $SiO_2/l$.

The precipitated silica suspension is diluted with 45,420 liters of water, the precipitated silica is separated by means of a filter press and then washed with water.

The filter cake, the solids content of which is approx. 20 wt. %, is liquefied by means of mechanical shear forces with the addition of concentrated sulphuric acid at a pH-value of 3.7 to 4.0 and then dried in a spray drier which is fitted with a rapidly rotating atomiser disc. Approx. 9.0 m³ of the suspension per hour are atomized and spray dried. The speed of the disc is 10,000 rpm. Approx. 1.8 t (9 m³. 20 wt. %=1.8 t $SiO_2$) of silica per hour are obtained. The inlet temperature of the hot gases is 700° to 750° C., the temperature of the effluent gases is 113° to 118° C. The average residence time of a silica particle in the hot gas stream is approx. 9 to 10 seconds. The spray-dried precipitated silica is separated from the hot gas stream by means of a filter and ground with a roller mill. The physical-chemical data are given in Table 1.

Example 2 (Comparison Example): Silica B 1,725 kg of sodium silicate solution (8.90 wt. % of $Na_2O$; 27.73 wt. % of $SiO_2$ with an $SiO_2:Na_2O$ modulus of 3.22) and 56.8 m³ of hot water are mixed in a 75 m³ container and adjusted to 93° C. The alkali value of the starting mixture (consumption of 1N HCl per 100 ml of starting solution against phenolphthalein) is 7.0.

During the next 90 minutes, while maintaining a constant alkali value of 7, 16,076 kg of sodium silicate solution (8.90 wt. % of $Na_2O$ and 27.73 wt. % of $SiO_2$; $SiO_2:Na_2O$ modulus=3.22, temperature 57° C.) and 2168 kg of 94% sulphuric acid are allowed to flow simultaneously into the starting mixture, with stirring, at 91°–93° C. The addition of sodium silicate solution is then stopped. The addition of 94% sulphuric acid is continued within 30 minutes with further stirring until the pH-value of the precipitation suspension has adjusted to 3.0. The solids content of the precipitated silica suspension obtained is 72 g/l. The suspension is diluted with 38,000 liters of water and the precipitated silica is separated by means of a filter press and washed with water.

After the wash process, the filter cake having a solids content of between 19 and 20 wt. % is liquefied by means of mechanical shear forces with the addition of concentrated sulphuric acid at a pH-value of 3.0 to 3.5 and then spray-dried in a spray drier which is fitted with a rapidly rotating atomiser disc with an continuously adjustable speed. In so doing, approx. 7.4 m³ of the suspension are atomized and spray-dried. The speed of the disc is adjusted to 8,500 rpm. Approx. 1.5 t of silica per hour are obtained. The inlet temperature of the hot gases is 700° to 750° C., the temperature of the effluent gases is 140° to 145° C. The spray-dried precipitated silica is separated from the hot gas stream by means of a filter and ground with a roller mill with a classifier from Neumann-Esser, Aachen, with a throughput of approx. 1.9 t/h. The milling and classifying conditions are chosen such that a product with the particle size distribution given in Table 1 is obtained. Approx. 5.25 t of a silica are obtained, the physical-chemical data of which are given in Table 1.

Example 3 (Comparison Example): Silica C 1680 kg of sodium silicate solution (8.90 wt. % of $Na_2O$; 27.73 wt. % of $SiO_2$ with an $SiO_2:Na_2O$ modulus of 3.22) and 56.6 m³ of hot water are mixed in a 75 m³ container and adjusted to 90° C. The alkali value of this mixture (consumption of 1N HCl per 100 ml starting solution against phenolphthalein) is 7.0.

Over a period of 90 minutes, while keeping the alkali value of 7 constant and a temperature of 90°–91° C., 21140 kg of sodium silicate solution (57° C., 8.90 wt. % of $Na_2O$ and 27.73 wt. % of $SiO_2$ with an $SiO_2:Na_2O$ modulus of 3.22) and 2851 kg of 94% sulphuric acid are added simultaneously, with stirring.

The addition of sodium silicate solution is then stopped and the addition of 94% sulphuric acid is continued until a pH-value of 8.5 is obtained after approx. 25 minutes.

There follows a 30-minute ageing phase at a pH-value= 8.5 during which neither acid nor water glass solution are added.

Finally, the pH-value is adjusted to approx. 4.0 with 94% sulphuric acid. The solids content of the precipitated silica obtained within 10 minutes is 88 g $SiO_2/l$.

The precipitated silica suspension is diluted with 45,920 liters of water, the precipitated silica is separated by means of a chamber filter press and washed with water.

The filter cake, the solids content of which is approx. 20 wt. %, is then liquefied by means of mechanical shear forces with the addition of concentrated sulphuric acid at a pH-value of 3.7 to 4.0 and then dried in a spray drier which is fitted with a rapidly rotating atomiser disc. Approx. 9.0 m³ of the suspension per hour are atomized and spray-dried. The speed of the disc is 10,000 rpm. Approx. 1.8 t (9 m³. 20 wt. %=1.8 t $SiO_2$) of silica per hour are obtained. The inlet temperature of the hot gases is 700° to 750° C., the temperature of the effluent gases is 113° to 118° C. The average residence time of a silica particle in the hot gas stream is approx. 9 to 10 seconds. The spray-dried precipitated silica is separated from the hot gas stream by means of a filter and ground with a roller mill. The physical-chemical data of the silica obtained are given in Table 1.

Example 4

A precipitated silica according to the invention is prepared in the same way as in Example 1. After precipitation, the precipitated silica is separated from the precipitation suspension by means of a filter press. The filter cake containing sodium sulphate is not washed. It is liquefied by means of mechanical shear forces—optionally with the addition of a little water—and worked up according to Example 1. The physical-chemical data of the silica obtained are given in Table 1.

Example 5

A precipitated silica according to the invention is prepared in the same way as in Example 2. After precipitation, the precipitated silica is separated from the precipitation suspension by means of a filter press. The filter cake containing sodium sulphate is not washed but liquefied by applying mechanical shear forces—optionally with the addition of a little water—and worked up according to Example 2. The physical-chemical data of the silica obtained are given in Table 1.

Example 6

A precipitated silica according to the invention is prepared in the same way as in Example 3. After precipitation, the precipitated silica is separated from the precipitation suspension by means of a chamber filter press. The filter cake containing sodium sulphate is not washed but liquefied by means of mechanical shear forces with the addition of concentrated sulphuric acid (to a pH-value of 3.7–4.0) and worked up according to Example 3. The physical-chemical data of the silica obtained are given in Table 1.

Example 7 (Comparison Example): Silica D

Silica D is prepared by the precipitation process according to Example 1. The silica is separated from the precipitation suspension by means of a membrane filter press (24% solids content). The filter cake is spin flash dried. No grinding takes place afterwards. The physical-chemical data of the silica are reproduced in Table 2.

Example 8 (Comparison Example): Silica E

Silica E is prepared in the precipitation stage according to Example 2. The silica is separated from the precipitation suspension by means of a membrane filter press (23% solids content). The filter cake is spin flash dried; no grinding takes place afterwards. The physical-chemical data of the silica are given in Table 2.

Example 9 (Comparison Example): Silica F

Silica F is prepared in the precipitation stage according to Example 3. The silica is separated from the precipitation suspension by means of a membrane filter press (24% solids content). The filter cake is spin flash dried. No grinding takes place. The physical-chemical data of the silica are summarized in Table 2.

Example 10

The precipitated silica according to the invention is prepared according to Example 7. The only difference compared with Example 7 is that the filter cake containing sodium sulphate is not washed. The filter cake obtained has a solids content of 32.6 wt. % (8.6% $Na_2SO_4$+24% $SiO_2$). The physical-chemical data of this silica may be derived from Table 2.

Example 11

The precipitated silica according to the invention is prepared according to Example 8. The only difference compared with Example 8 is that the filter cake containing sodium sulphate is not washed. The filter cake obtained has a solids content of 31.9 wt. % (8.9% $Na_2SO_4$+23% $SiO_2$). The physical-chemical data of this silica may be derived from Table 2.

Example 12

The precipitated silica according to the invention is prepared according to Example 9. The only difference compared with Example 9 is that the filter cake containing sodium sulphate is not washed. The filter cake obtained has a solids content of 33.1 wt. % (8.6% $Na_2SO_4$+24.5% $SiO_2$). The physical-chemical data of this silica may be found in Table 2.

The physical-chemical data of the silicas prepared according to Examples 1–12 are given in Tables 1 and 2.

TABLE 1

| Precipitated silica name | 1 Silica A | 2 Silica B | 3 Silica C | 4 Silica according to the invention | 5 Silica according to the invention | 6 Silica according to the invention |
|---|---|---|---|---|---|---|
| Parameters: | | | | | | |
| Sodium sulphate content; wt. % | 0.9 | 1.4 | 1.1 | 10.1 | 10.8 | 8.2 |
| BET surface; $m^2/g$ | 180 | 178 | 121 | 155 | 156 | 118 |
| DBP absorption; g/100 g (anhydrous) | 246 | 238 | 285 | 235 | 211 | 244 |
| Loss on drying; wt. % (2 h/105° C.) | 5.2 | 4.9 | 4.6 | 4.9 | 5.1 | 4.7 |
| Oversize with ALPINE air-jet sleve; wt. % | | | | | | |
| >63 μm | 8.0 | 5.3 | 1.0 | 2.2 | 5.1 | 2.8 |
| >150 μm | 0.01 | <0.01 | 0.01 | 0.02 | <0.01 | 0.04 |
| >250 μm | <0.01 | <0.01 | <0.01 | 0.01 | <0.01 | <0.01 |

TABLE 2

| Precipitated silica name | 7<br>Silica D | 8<br>Silica E | 9<br>Silica F | 10<br>Silica according to the invention | 11<br>Silica according to the invention | 12<br>Silica according to the invention |
|---|---|---|---|---|---|---|
| Parameters: | | | | | | |
| Sodium sulphate content; wt. % | 1.4 | 1.3 | 1.9 | 8.6 | 8.9 | 8.6 |
| BET surface; m²/g | 190 | 180 | 127 | 164 | 158 | 118 |
| DBP absorption; g/100 g (anhydrous) | 228 | 234 | 230 | 209 | 214 | 214 |
| Loss on drying; wt. % (2 h/105° C.) | 5.5 | 4.7 | 5.0 | 5.0 | 5.2 | 4.7 |
| Oversize with ALPINE air-jet sieve; wt. % | | | | | | |
| >63 μm | 1.8 | 2.5 | 4.6 | 1.6 | 2.1 | 3.2 |
| >150 μm | 0.01 | 0.01 | 0.03 | <0.01 | 0.01 | 0.03 |
| >250 μm | <0.01 | <0.01 | 0.01 | <0.01 | <0.01 | 0.01 |

The physical-chemical data are determined with the following methods of measurement:
1. BET Surface Area
   DIN 66 131
2. DBP Absorption
   DIN 53 601/ASTM D 2414
3. Loss on Drying
   DIN ISO 787/II, ASTM D 280, JIS K 5101/21
4. Oversize with the ALPINE Air-Jet Sieve The precipitated silica is screened through a 500 μm sieve in order to remove any deaeration lumps. 10 g of the screened precipitated silica are then placed on a particular air-jet sieve and screened under a reduced pressure of 200 mm water column. Precipitated silica particles which settle on the acrylic glass cover of the screening device are knocked off by a few taps on the knob of the screen cover. Screening ends when the oversize remains constant, a situation which can usually be recognized from the free-flowing appearance. For safety's sake, screening is then continued for another minute. The screening process generally takes five minutes. In the case of materials that contain only particle size fractions of <500 μm, the sample is not screened beforehand, but placed directly on the air-jet sieve.

In the event of any agglomerates forming, the screening process is briefly interrupted and the agglomerates broken up with a brush under gentle pressure. After screening, the oversize is carefully tapped off the air-jet sieve and reweighed.

Calculation: The oversize is given in weight percent in conjunction with the mesh size of the sieve.

Apparatus: ALPINE air-jet sieve, laboratory type S 200, with screen fabric according to DIN 4188.

Sulphate Content 0.3–0.4 g of a precipitated silica are heat-treated in an ultra-pure oxygen stream at 1350° C. All the sulphur compounds are thus converted to $SO_2$ which, together with a carrier gas—ultra-pure oxygen—is passed through an infrared cell, the Sulfur Determinator SC 32 from LECO. The $SO_4^{-2}$ content is derived from the infra-red measurement. The measurement is checked by incorporating standards.

In Examples 13–24, the silicas prepared according to Examples 1–12 are tested for their applications-related properties (extrusion) and characterized (film properties).

Example 13

750 g of silica according to Example 1 are mixed in a fluid mixer (FM 10 C type from Thyssen Henschel, Kassel, FRG) with 288 g of Hostalen GUR 4130 (ultra-high molecular weight type of high density polyethylene from HOECHST AG, Frankfurt a.M.) with 6.5 g of Topanol® O antioxidant (ICI, England; butylated hydroxytoluene), and with 4.0 g of COLCOLOR® E 50/G carbon black masterbatch (DEGUSSA AG, Frankfurt/Main. containing 50% PRINTEX® G carbon black pigment in low density polyethylene) at a speed of 700 rpm, and then sprayed with a quantity of 1590 g of Gravex mineral oil 942 (Shell) using a gear pump and a single-component nozzle. The product thereby obtained is a free-flowing and continuously meterable powder which is processed with the aid of a twin-screw extruder (ZSK 30M 9/2 type from Werner & Pfleiderer, Stuttgart) with heated flat-sheet die 220 mm wide (G öttfert Prüfmaschinen GmbH, Buchen) and a triple-roll calender (Polyfol 150 3 S type from Ruth Schwabenthan, Berlin) to obtain a film about 0.25 mm thick. At a screw speed of 50 rpm, a temperature profile of 150° to 195° C. is chosen between the feed zone of the extruder and the die. The melt temperature measured between the extruder and the die is 190° C. The melt pressure in bar and the torque of the screws as a % of the maximum permissible torque can be read off the twin-screw extruder as a measure of the processing behavior of the mixture during extrusion. The mineral oil is then extracted to a large extent from the film thus produced with hexane so that a microporous separator film is obtained. The measured values determined from the film prepared are summarised in Table 3. These values form the reference values for Example 16.

Example 14

750 g of a precipitated silica according to Example 2 are mixed in a fluid mixer (FM 10 C type from Thyssen Henschel, Kassel) with 250 g of Himont 1900 (ultra-high molecular weight, high density polyethylene from Himont, USA) with 4.0 g of COLCOLOR® E50/G (carbon black concentrate with 50% PRINTEX® G carbon black pigment in low density polyethylene from DEGUSSA AG, Ffm.), and with 2.4 g of Topanol® O (butylated hydroxytoluene as antioxidant from ICI, England) at a speed of 700 rpm and then sprayed with a quantity of 1550 g of Gravex 942 mineral oil from Shell using a gear pump and a single-component nozzle. The product thereby obtained is a free-flowing, continuously meterable powder which is processed with the aid of a twin-screw extruder (ZSK 30M 9/2 type from Werner & Pfleiderer, Stuttgart) with heated flat-sheet die 220 mm wide (Göttfert Prüfmaschinen GmbH, Buchen) and a triple roll calender (Polyfol 150 3 S type from Ruth Schwabenthan, Berlin) to obtain a film about 0.25 mm thick. At a screw speed of 50 rpm, a temperature profile of 150° to 195° C. is chosen between the feed zone of the extruder and the die. The melt temperature measured between the extruder and the die is 187° C. The melt pressure in bar and the torque of the screws as a % of the maximum permissible torque are read off the twin-screw extruder as a measure of the processing behaviour of the mixture during extrusion. The mineral oil is then extracted to a large extent from the film thus produced with hexane so that a microporous separator film is obtained. The measured values determined from the film prepared are summarized in Table 3. These values form the reference values for Example 17.

Example 15

The preparation of a separator film containing silica C (Example no. 3) as comparison silica takes place in substantially the same way as in Example no. 13. In view of the markedly increased absorption of this silica, the oil quantity is increased from 1590 g to 1900 g of oil. Moreover, the HOECHST polymer GUR 4132 from Bayport is used instead of GUR 4130. The melt temperature measured between the extruder and the die is 193° C. The melt pressure is 136 bar and the torque is 53%. The measured values obtained in respect of the film are summarized in Table 3. These values form the reference values for Example 18.

Example 16

750 g of silica according to Example 4 are mixed in a fluid mixer (FM 10 C type from Thyssen Henschel, Kassel, FRG) with 288 g of Hostalen GUR 4130 (ultra-high molecular weight type of high density polyethylene from CELANESE (Hoechst AG, Bayport, Tex., USA) with 6.5 g of Topanol® O antioxidant (ICI, England, butylated hydroxytoluene) and with 4.0 g of COLCOLOR® E50/G (DEGUSSA AG, Ffm. containing 50% PRINTEX® G carbon black pigment in low density polyethylene) at a speed of 700 rpm and then sprayed with a quantity of 1590 g of Gravex 942 mineral oil from SHELL using a gear pump and a single-component nozzle. The same method of extrusion and extraction as in Example 13 are used. The melt temperature measured between the extruder and the die is 195° C. The measured values determined in respect of the film may be found in Table 3. These values are to be compared with those of the comparison example 13.

Example 17

The silica according to the invention prepared according to Example 5 is tested in accordance with the recipe and operating procedure of Example 14. The melt temperature measured between the extruder and the die is 175° C.; the melt pressure of 162 bar and the torque value of 52% also demonstrate the highly favorable extrusion behaviour of this spray-dried silica with a high sodium sulphate content. The values measured in respect of the films prepared may be found in Table 3. These data are to be compared with those of comparison example 14.

Example 18

The silica according to the invention prepared according to Example 6 is tested in accordance with the recipe and operating procedure of Example 15. The melt temperature measured between the extruder and the die is only 191° C.; the melt pressure of 128 bar and the torque value of 50% also show the positive effects of the high salt content on the extrusion behavior. The values measured in respect of the film may be found in Table 3. These values are to be compared with those of comparison example 15.

TABLE 3

| | | Example no. | | | | | |
|---|---|---|---|---|---|---|---|
| | | 13<br>Silica A<br>as in<br>Example 1 | 14<br>Silica B<br>as in<br>Example 2 | 15<br>Silica C<br>as in<br>Example 3 | 16<br>Silica<br>acc. to<br>invention<br>as in<br>Example 4 | 17<br>Silica<br>acc. to<br>invention<br>as in<br>Example 5 | 18<br>Silica<br>acc. to<br>invention<br>as in<br>Example 6 |
| Precipitated silica | | | | | | | |
| Melt temperature | °C. | 190 | 187 | 193 | 195 | 175 | 191 |
| Melt pressure | bar | 185 | 180 | 136 | 184 | 162 | 128 |
| Torque | % | 68 | 57 | 53 | 63 | 52 | 50 |
| Resistivity<br>after 20 min. soak<br>after 24 hours' soak | m Ω x<br>inch$^2$<br>per<br>mil | 1.42<br>1.23 | 1.59<br>1.09 | 2.77<br>1.88 | 1.76<br>1.39 | 1.68<br>1.12 | 2.23<br>1.58 |
| Shrinkage:<br>after 1 hour's<br>storage in water and<br>8 hours' air drying | | | | | | | |
| MD | % | 6.5 | 4.5 | 3.4 | 5.1 | 5.5 | 4.7 |
| CMD | % | 3.7 | 3.0 | 2.0 | 2.4 | 2.8 | 2.6 |
| Mechanical<br>properties: | | | | | | | |
| Puncture resistance | N | not det. | not det. | 10.7 | 13.6 | not det. | 11.3 |
| Elongation at break | %' | 945 | 697 | 593 | 915 | 654 | 607 |

TABLE 3-continued

| | | Example no. | | | | | |
|---|---|---|---|---|---|---|---|
| | | 13<br>Silica A<br>as in<br>Example 1 | 14<br>Silica B<br>as in<br>Example 2 | 15<br>Silica C<br>as in<br>Example 3 | 16<br>Silica<br>acc. to<br>invention<br>as in<br>Example 4 | 17<br>Silica<br>acc. to<br>invention<br>as in<br>Example 5 | 18<br>Silica<br>acc. to<br>invention<br>as in<br>Example 6 |
| Precipitated silica | | | | | | | |
| CMD | | | | | | | |
| Tensile strength CMD | N/mm$^2$ | 7.12 | 5.82 | 7.64 | 6.94 | 4.96 | 8.37 |

Example 19

The applications-related properties of the silica prepared according to Example 7 are tested in accordance with the recipe and procedure of Example 13. The melt temperature measured between the extruder and the die is 192° C. The data measured in respect of the film may be found in Table 4. These values are to be compared with the data of Example 22.

Example 20

The applications-related properties of the silica prepared according to Example 8 are tested in accordance with the recipe and procedure of Example 14. The melt temperature measured between the extruder and the die is 181° C. The data measured in respect of the film may be found in Table 4. They are to be compared with the data of Example 23.

Example 21

The applications-related properties of the silica prepared according to Example 9 are tested in accordance with the recipe and procedure of Example 15. The melt temperature measured between the extruder and the die is 192° C. The data measured in respect of the film may be found in Table 4. They are to be compared with the data of Example 24.

Example 22

The silica according to the invention prepared according to Example 10 is tested in accordance with the recipe and procedure of Example 19. Only the oil quantity is altered to 1450 g. The extrusion data (see Table 4) are influenced in a highly favorable manner by the high salt content of the silica according to the invention. The data measured in respect of the film may be found in Table 4. They are to be compared with the data of comparison example 19.

Example 23

The silica according to the invention prepared according to Example 11 is tested in accordance with the recipe and procedure of Example 20. The extrusion data (see Table 4 and there the melt temperature, melt pressure and torque) are markedly reduced due to the high salt content of the silica according to the invention, and this has a favourable effect on the extrusion process. The data measured in respect of the film may be found in Table 4. They are to be compared with the data of comparison example 20.

Example 24

The silica according to the invention prepared according to Example 12 is tested in accordance with the recipe and procedure of Example 21. The melt temperature measured between the extruder and the die is at a lower value of 189° C. The melt pressure and torque values also tend to be lower, which has a very positive effect on the extrusion (processability) of the mixture. The data measured in respect of the film may be found in Table 4. They are to be compared with the data of comparison example 21.

Generally speaking, it can be deduced from Tables 3 and 4 that in a comparison of the data for the production of separators with silicas having an Na$_2$SO$_4$ content (<2.5 wt. %) and those prepared from silicas with an increased salt content, a higher salt content reduces the torque in each case. This also applies to the die pressure and the melt temperature. An increasing salt content therefore improves the processability of the mixtures (compare Example 13 with Example 16, and Example 14 with Example 17, and Example 19 with Example 22, and Example 20 with Example 23).

In the case of the film data, it is apparent that the shrinkage values are noticeably lower in separators composed of silicas with a high Na$_2$SO$_4$ content, while the electrical and mechanical data hardly change at all despite the 10% lower silica content (compare Example 13 with 16; Example 14 with 17; Example 19 with 22; Example 20 with 23).

Example 25

1500 g of commercial silica Ultrasil® VN3 fbg are mixed and processed according to the specification of Example 13 with 577 g of Hostalen GUR 4130 Bayport (ultra-high molecular weight high density polyethylene from CELANESE, Bayport, Tex., USA), with 8.0 g of COL-COLOR® E50/G carbon black masterbatch (carbon black concentrate with 50% PRINTEX® G carbon black pigment in polyethylene, from DEGUSSA AG, Ffm.) and with 13.0 g of Topanol O antioxidant (butylated hydroxytoluene from ICI, England), and with a quantity of 3180 g of Gravex-Oel 942 (mineral oil from Shell). Extrusion to an oil-containing separator film (blacksheet) also takes place in accordance with the specification of Example 13. The oil-containing film is extracted with n-hexane according to the above-mentioned process instructions to a residual oil content of 12–14 wt. %. This greysheet undergoes the storage test according to Example 27.

TABLE 4

| | | Example no. | | | | | |
|---|---|---|---|---|---|---|---|
| Precipitated silica | | 19<br>Silica D<br>as in<br>Example 7 | 20<br>Silica E<br>as in<br>Example 8 | 21<br>Silica F<br>as in<br>Example 9 | 22<br>Silica<br>acc. to<br>invention<br>as in<br>Example 10 | 23<br>Silica<br>acc. to<br>invention<br>as in<br>Example 11 | 24<br>Silica<br>acc. to<br>invention<br>as in<br>Example 12 |
| Melt temperature | °C. | 192 | 181 | 192 | 186 | 175 | 189 |
| Melt pressure | bar | 174 | 172 | 176 | 156 | 165 | 172 |
| Torque | % | 62 | 55 | 68 | 57 | 51 | 64 |
| Resistivity | m Ω x | | | | | | |
| after 20 min. soak | inch$^2$ | 2.28 | 1.52 | 2.22 | 2.39 | 1.60 | 2.15 |
| after 24 hours' soak | per<br>mil | 1.65 | 1.02 | 1.50 | 1.78 | 1.07 | 1.40 |
| Shrinkage:<br>after 1 hour's<br>storage in water and<br>8 hours' air drying | | | | | | | |
| MD | % | 5.8 | 5.2 | 4.3 | 3.8 | 4.8 | 3.3 |
| CMD | % | 3.7 | 3.4 | 2.4 | 2.2 | 3.0 | 2.0 |
| Mechanical<br>properties: | | | | | | | |
| Puncture resistance | N | 13.0 | not det. | 12.2 | 14.6 | not det. | 13.8 |
| Elongation at break<br>CMD | % | 710 | 645 | 1077 | 790 | 670 | not det. |
| Tensile strength<br>CMD | N/mm$^2$ | 6.85 | 5.50 | 8.65 | 7.44 | 5.33 | 10.89 |

Example 26

1350 g of the commercial silica Ultrasil® VN3 fbg and 150 g of anhydrous sodium sulphate are processed in accordance with Example 25 to an oil-containing separator film. The film is extracted as described in Example 25 and included in the storage tests according to Example 27.

Example 27

In a so-called soak study (storage in the media "battery acid" (37% sulphuric acid) and water (distilled water)), the films of Examples 22, 25 and 26 extracted to a residual oil content of 12–14% are stored over a period of eight weeks and measurements of the resistivity are carried out on the samples after a storage period of 1 hour, 1 day, 1 week, 2 weeks, 4 weeks, 6 weeks and 8 weeks. The films stored in water were not dried before the resistivity was measured, but measured in the wet state in battery acid.

The results of this series of measurements are summarized in Table 5.

Surprisingly, it was ascertained that:

the starting resistivity of the separators with silicas with a high salt content after one hour's storage in both media is as much as more than 50% lower than that of comparable films with silicas with a normal salt content.

the simple addition of crystalline sodium sulphate pushes up the starting resistivity. That is, it is not merely the addition of the hydrophilic agent but its very highly disperse distribution which causes the above effect.

the final resistivity of the separators with the silicas with a high salt content according to the invention after a storage period of only about two weeks in both media is 33% lower than the state of the art which can be achieved at the present time with the commercial product Ultrasil® VN3 fbg.

the final resistivity of separators which are produced by simply adding sodium sulphate is comparable with or higher than the starting resistivity of the separators produced with the silicas according to the invention.

the storage medium—battery acid or water—does not indicate a lasting difference in the phenomena observed. The resistivity values achieved by storage in acid tend to be 8–12% lower compared with storage in water.

Further variations and modifications of the invention herein described will be apparent to those skilled in the art from the foregoing and are intended to be encompassed by the claims appended hereto.

German priority application 195 26 476.2 is relied on and incorporated herein by reference.

TABLE 5

Decrease over time in the resistivity of various separators after several weeks' storage in battery acid and water.

| | Silica: | | | | | |
|---|---|---|---|---|---|---|
| | Ultrasil VN3-HSC | Ultrasil VN3 fbg | Ultrasil VN3 fbg + 10% Na$_2$SO$_4$ | Ultrasil VN3-HSC | Ultrasil VN3 fbg | Ultrasil VN3 fbg + 10% Na$_2$SO$_4$ |
| Separator acc. to Example no. | 22 | 25 | 26 | 22 | 25 | 26 |
| Storage time: | Resistivity values in m A. inch$^2$/mil | | | | | |
| Type of storage: | Storage in acid | | | Storage in water | | |
| 1 hour | 1.99 | 3.09 | 3.53 | 1.95 | 2.41 | 3.47 |
| 1 day | 1.71 | 2.22 | 2.68 | 1.76 | 1.97 | 2.59 |
| 1 week | 1.39 | 2.00 | 2.43 | 1.60 | — | 2.59 |
| 2 weeks | 1.23 | — | 2.24 | 1.39 | 1.87 | 2.60 |
| 4 weeks | 1.27 | 1.68 | 2.19 | 1.25 | 1.85 | 2.34 |
| 6 weeks | 1.14 | 1.68 | 2.03 | 1.21 | 1.82 | 2.21 |
| 8 weeks | 1.12 | 1.68 | 2.03 | 1.27 | 1.83 | 2.20 |

We claim:

1. An unwashed, dried precipitated silica with a sodium sulphate content of 4 to 18 wt. %.

2. An unwashed, dried precipitated silica according to claim 1, characterized by the physical-chemical data:

| | |
|---|---|
| Sodium sulphate content: | 4–18, |
| BET surface area (DIN 66131): | 100–190 m$^2$/g |
| DBP absorption (anhydrous) (DIN 53601, ASTM D 2414): | 208–250 g/100 g |
| Loss on drying (2h/105° C.) (DIN ISO 787/II, ASTM D 280, JIS K 5101/21): | 3.0–6.5 |
| | 3.0–6.5 wt. % |
| Oversize with ALPINE air-jet sieve | >63 μm ≦ 10.0 wt. % |
| | >150 μm ≦ 0.1 wt. % |
| | >250 μm ≦ 0.01 wt. %, |

3. A battery separator for lead-acid batteries composed of polyethylene and containing a precipitated silica according to claim 2.

4. A method of making a battery separator comprising mixing the silica according to claim 1 with a plastic polymer and shaping a battery separator from the resulting admixture.

5. A battery separator containing a precipitated silica according to claim 1.

6. A battery separator for lead-acid batteries composed of polyethylene and containing a precipitated silica accordingto claim 1.

7. A process for the preparation of an unwashed precipitated silica with the physical-chemical data:

| | |
|---|---|
| Sodium sulphate content: | 4–18, wt. % |
| BET surface area (DIN 66131): | 100–190 m$^2$/g |
| DBP absorption (anhydrous) (DIN 53601, ASTM D 2414): | 208–250 g/100 g |
| Loss on drying (2h/105° C.) (DIN ISO 787/II, ASTM D 280, JIS K 5101/21): | 3.0–6.5 |
| | 3.0–6.5 wt. % |
| Oversize with ALPINE air-jet sieve | >63 μm ≦ 10.0 wt. % |
| | >150 μm ≦ 0.1 wt. % |
| | >250 μm ≦ 0.01 wt. %, | consisting essentially of introducing hot water into a precipitation vessel, adding water glass to said hot water while stirring, said water glass having an SiO$_2$:Na$_2$O modulus of 3.22±0.05 until a pH value of 7±1 is reached, heating the resulting reaction mixture to a temperature of 89° to 93° C. and maintaining at this temperature throughout the remaining precipitation period, simultaneously adding to said precipitation vessel further water glass of the same composition and sulphuric acid each at a different place in said precipitation vessel in such a way that an alkali value of 7±1 is maintained, acidifying the resulting precipitated silica suspension with sulphuric acid to a pH-value of 3.0–4.0, the resulting precipitated silica suspension having a solids content of 72 to 88 g/l, separating said suspension by filtering means without washing the sodium sulphate-containing precipitated silica filter cake, liquefying said filter cake by means of water and mechanical shear forces, drying said cake and optionally grinding to produce the desired size of silicon.

8. The process according to claim 7, wherein drying is by means of a spray drier with a centrifugal atomizer at a speed of 8,500–10,000 rpm.

9. The process according to claim 7, further comprising, acidifying to a pH-value 8.5, aging said product for a 30 minute aging stage and then acidifying the product to a pH-value of 3.0–4.0.

10. The process according to claim 7, wherein a spin flash drier is used wherein the unwashed precipitated silica filter cake has a solids content of 29–37 wt. %.

11. The process according to claim 7, further comprising grinding with a roller mill.

12. The process according to claim 11 wherein grinding is carried out using a crossflow mill.

13. A battery separator containing a precipitated silica according to claim 2.

* * * * *